United States Patent
Wargo

(10) Patent No.: US 10,627,043 B2
(45) Date of Patent: Apr. 21, 2020

(54) HINGED MAGNETIC MOUNTING APPARATUS

(71) Applicant: MAGNACURVE, LLC, Austin, TX (US)

(72) Inventor: Joseph Wargo, Spicewood, TX (US)

(73) Assignee: Magnacurve LLC, Austin, TX (US)

( * ) Notice: Subject to any disclaimer, the term of this patent is extended or adjusted under 35 U.S.C. 154(b) by 492 days.

(21) Appl. No.: 15/344,312

(22) Filed: Nov. 4, 2016

(65) Prior Publication Data

US 2017/0350553 A1 Dec. 7, 2017

Related U.S. Application Data

(60) Provisional application No. 62/345,328, filed on Jun. 3, 2016.

(51) Int. Cl.
*F16M 13/02* (2006.01)
*H01Q 1/12* (2006.01)
*H01Q 1/24* (2006.01)

(52) U.S. Cl.
CPC .......... *F16M 13/02* (2013.01); *F16M 13/022* (2013.01); *H01Q 1/12* (2013.01); *H01Q 1/1221* (2013.01); *H01Q 1/246* (2013.01)

(58) Field of Classification Search
CPC .................... F16B 2001/0035; H01F 7/0252
USPC .................... 248/683, 206.5, 309.4
See application file for complete search history.

(56) References Cited

U.S. PATENT DOCUMENTS

| | | | | |
|---|---|---|---|---|
| 2,219,370 A * | 10/1940 | Pierce, Jr. | ............... | F16M 11/10 248/168 |
| 4,300,754 A * | 11/1981 | Lawrence | .......... | B23K 37/0435 269/208 |
| 4,543,584 A * | 9/1985 | Leer | ......................... | H01Q 1/08 248/537 |
| 6,279,885 B1 * | 8/2001 | Leon, Jr. | ............ | B23K 37/0435 269/8 |
| 9,188,276 B2 * | 11/2015 | Klein | .................. | F16M 11/126 |
| 9,273,819 B2 * | 3/2016 | Pinchevski | .......... | F16M 13/022 |
| 9,472,937 B2 * | 10/2016 | Klein | ........................ | H02G 3/32 |
| 9,577,417 B2 * | 2/2017 | Stechmann | ............. | H02G 3/32 |
| 9,610,901 B2 * | 4/2017 | Sheehan | .................. | B60R 9/08 |
| 9,939,104 B2 * | 4/2018 | Smith | .................. | F16M 13/022 |
| 10,163,325 B2 * | 12/2018 | Klein | .................. | G08B 21/187 |
| 2011/0198174 A1 * | 8/2011 | Ollgaard | ................. | F03D 80/88 188/378 |
| 2013/0068709 A1 * | 3/2013 | Liu | ......................... | B25H 3/04 211/70.6 |
| 2014/0103169 A1 * | 4/2014 | Heard | .................. | B63B 27/146 248/65 |
| 2017/0159880 A1 * | 6/2017 | Stechmann | .......... | F16M 13/022 |

* cited by examiner

*Primary Examiner* — Bradley Duckworth
(74) *Attorney, Agent, or Firm* — RM Reed Law PLLC

(57) ABSTRACT

In some embodiments, a magnetic mounting assembly can include a flange portion. The flange portion may include a base plate coupled to a magnet and including a first hinge along a first edge and a second hinge along a second edge. The flange portion may also include a sidewall extending from the base plate and including a hinge along a distal end of the sidewall. Further, the flange portion may include a mounting plate including a hinge configured to mate with the hinge of the sidewall to provide a mounting surface configured to pivot about the hinge.

20 Claims, 11 Drawing Sheets

HINGED MAGNETIC MOUNTING APPARATUS

CROSS-REFERENCE TO RELATED APPLICATION(S)

The present disclosure is a non-provisional of and claims priority to U.S. Provisional Patent Application No. 62/345,328 filed on Jun. 3, 2016 and entitled "Hinged Magnetic Mounting Apparatus," which is incorporated herein by reference in its entirety.

FIELD

The present disclosure is generally related to a magnetic mounting apparatus that can be used to mount devices (such as antennas, cameras, lights, and so on), cabinets or enclosures, or other elements to a structure and more particularly, to magnetic mounting apparatus that includes hinges to conform the magnetic mounting apparatus to the curvature of a surface, such as water towers, silos, buildings, and the like.

BACKGROUND

In some instances, devices, such as lock boxes, storage cabinets, cameras, sensors, antenna, other devices, or any combination thereof may be coupled to a structure above the ground. In some embodiments, bolts, screws or other attachment mechanisms may be used to attach the devices. In a particular example, to facilitate radio frequency transmissions, radio frequency (RF) transceiver system including transceiver devices (such as dish antennas, cellular antennas, other receiver/transmitter devices, or any combination thereof) and associated electronic equipment and circuitry may be positioned at a selected height above the ground. In some examples, radio frequency towers (such as cellular towers) may be constructed to secure such RF transceivers. In other instances, the RF transceivers may be coupled to existing structures (such as water towers, building heating, ventilation and air conditioning systems, and the like).

SUMMARY

Embodiments of a mounting apparatus described herein may be configured to couple to a surface, such as a metal surface. The mounting apparatus may include one or more mounting plates, each of which may be coupled to the surface by a magnet. Each mounting plate may include at least one hinge configured to couple the mounting plate to an adjacent mount plate. The hinged couplings allow the mounting apparatus to mate to a curved surface. Further, at least one of the mounting plates may include a flange having an additional hinge and configured to engage a mounting surface that can be coupled to a base of an antenna.

In some embodiments, a magnetic mounting assembly can include a flange portion. The flange portion may include a base plate coupled to a magnet and including a first hinge along a first edge and a second hinge along a second edge. The flange portion may also include a sidewall extending from the base plate and including a hinge along a distal end of the sidewall. Further, the flange portion may include a mounting plate including a hinge configured to mate with the hinge of the sidewall to provide a mounting surface configured to pivot about the hinge.

In other embodiments, a magnetic mounting assembly may be configured to couple a device to a metallic structure. The assembly may include a flange portion that includes a mounting plate configured to engage a mounting structure of the device, a base plate coupled to the mounting plate and including a magnet configured to engage a surface of a structure, and first and second hinges coupled to the base plate. The assembly may also include a plurality of hinged plates. Each hinged plate may include a planar surface coupled to a magnet and at least one hinge configured to couple to engage at least one of the first hinge and the second hinge of the base plate.

In still other embodiments, a magnetic mounting assembly may include a flange portion including a base plate coupled to a magnet and may include a first hinge along a first edge and a second hinge along a second edge. The flange portion can include a mounting plate configured to couple to a device. The magnetic mounting assembly may further include a first hinged plate coupled to a magnet and including a first hinge configured to couple to the first hinge of the flange portion. Additionally, the magnetic mounting assembly may include a second hinged plate coupled to a magnet and including a first hinge configured to couple to a second hinge of the flange portion.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
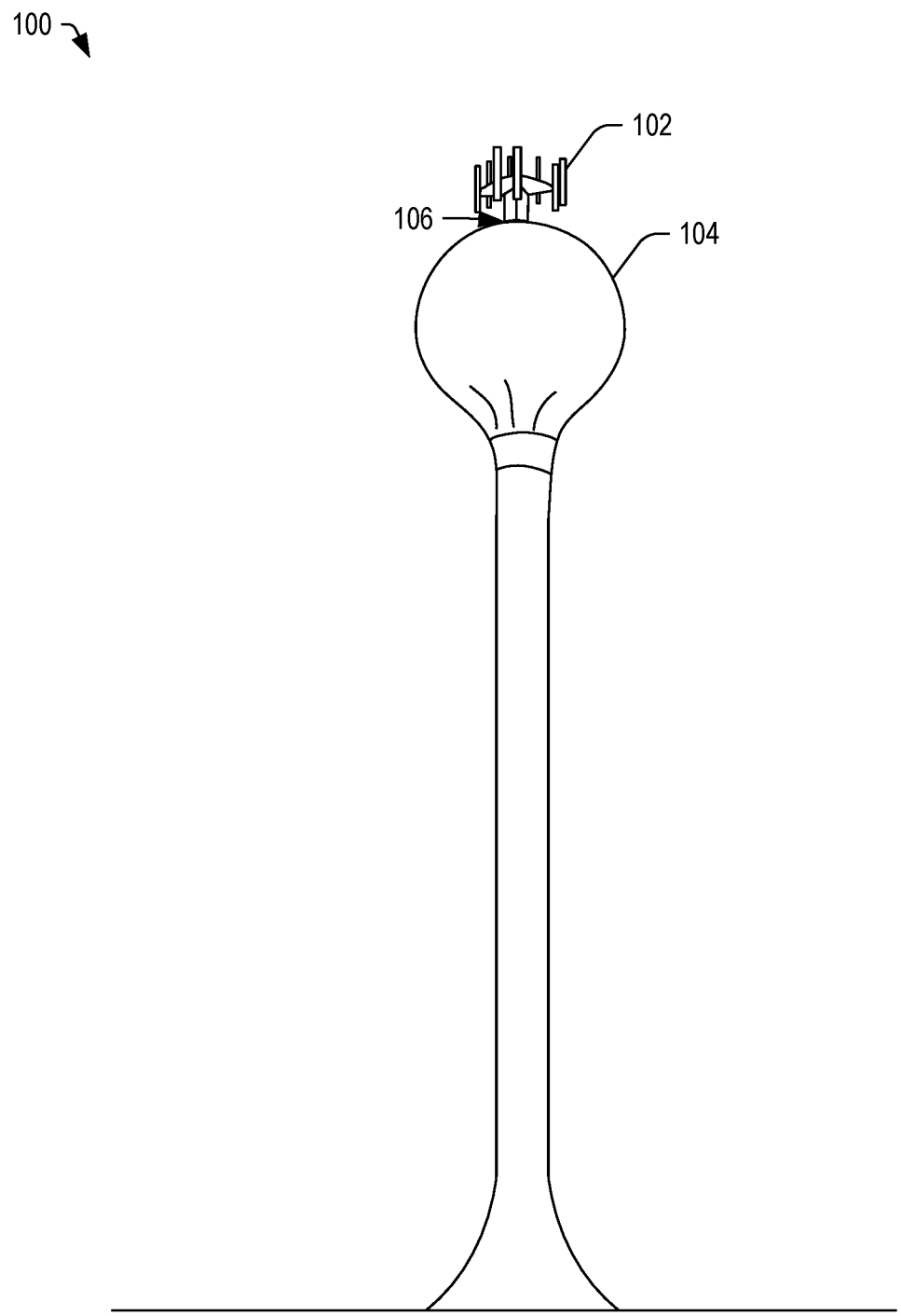
FIG. 1 depicts a side view of a system including an antenna device mounted to a water tower using a hinged magnetic mounting apparatus, in accordance with certain embodiments of the present disclosure.

Embodiments of a hinged magnetic mounting apparatus are described below, which apparatus may be used to couple a device, such as an antenna, electronic devices, storage cabinets, other devices, or any combination thereof, to a substrate. In some examples, the substrate may include a top or side of a metallic structure, such as a water tower, a heating, ventilation and air conditioning unit, a building, a tower, or another structure.

In certain embodiments, the hinged magnetic mounting apparatus may include a flange portion including a base coupled to a magnet and configured to magnetically attach to a structure. The base may define a first surface extending substantially parallel to a surface of the structure. The flange portion may further include a side wall extending from the base at an angle that is approximately perpendicular to the first surface. The flange portion may also include a first hinge coupled to an edge of the sidewall that is opposite to the base. The hinged magnetic mounting apparatus may further include a mounting plate configured to couple to the first hinge via a pin (or bolt) and attach to an attachment plate of a device, such as an antenna, a camera, a sensor, a light, an electronic device, a storage cabinet or box, another device, another component, or any combination thereof. It should be appreciated that the mounting plate may be configured to pivot about the first hinge and bolt over a limited arc that provides some "play" or adjustment capability during installation.

In some embodiments, the base of the flange portion may include hinge elements coupled to edges adjacent to the side wall. The hinged magnetic mounting structure may further include one or more additional plates including corresponding hinge elements configured to mate with the hinge elements of the base. Each plate may be coupled to a magnet and configured to magnetically couple to the structure. The plates may be configured to pivot about the hinges to enable the magnets to couple to the structure, even when the surface of the structure is curved. Further, in some instances, the surface of the structure may expand and contract as the temperature fluctuates, and the hinged magnetic mounting structure may be configured to maintain consistent contact between the magnets and the surface through such temperature fluctuations. Other embodiments are also possible.

In the following discussion, embodiments of a hinged magnetic mounting apparatus are described that may be used to couple any number of devices to a structure. Such devices can include sensors, cameras, lights, reflectors, photovoltaic cells, storage structures (e.g., cabinets, lock boxes, and the like), masts, flag poles, antennas, other devices, or any combination thereof. In the following discussion, the hinged magnetic mounting apparatus is described in the context of coupling a radio frequency antenna to a structure; however, the hinged magnetic mounting apparatus may be used to couple a variety of different devices, elements, or components to a structure. One possible example of a system that includes a hinged magnetic mounting apparatus to couple an antenna device to a structure (such as a water tower) is described below with respect to FIG. 1.

FIG. 1 depicts a side view of a system 100 including an antenna device 102 mounted to a water tower 104 using a hinged magnetic mounting apparatus 106, in accordance with certain embodiments of the present disclosure. The hinged magnetic mounting apparatus 106 may include a flange portion coupled to the antenna device 102 and magnetically coupled to the water tower 104. The mounting apparatus 106 may optionally at least one plate including a magnet to couple the plate to the water tower 104 and coupled to the flange portion by a hinge. The hinge may be formed by corresponding knuckles on the hinge and the plate, which may be coupled together by a pin or pivot. The plate may pivot about the hinge point to enable surface contact between the magnet and a surface of the water tower 104, even if the mounting surface of the water tower 104 is curved and even when the mounting surface of the water tower 104 expand or contracts due to temperature changes.

While the example depicted in FIG. 1 includes a cellular antenna having a pillar-type of mounting structure, other types of antenna or electronic devices (or even passive structures, such as storage cabinets) may be coupled to a structure, such as the water tower 104 (or another structure, such as a building, a wall, a pole, or another structure). Further, in some embodiments, the hinged magnetic mounting structure 106 may include multiple assemblies or feet, which may couple support arms to the surface. Other embodiments are also possible.

Figure 2A:
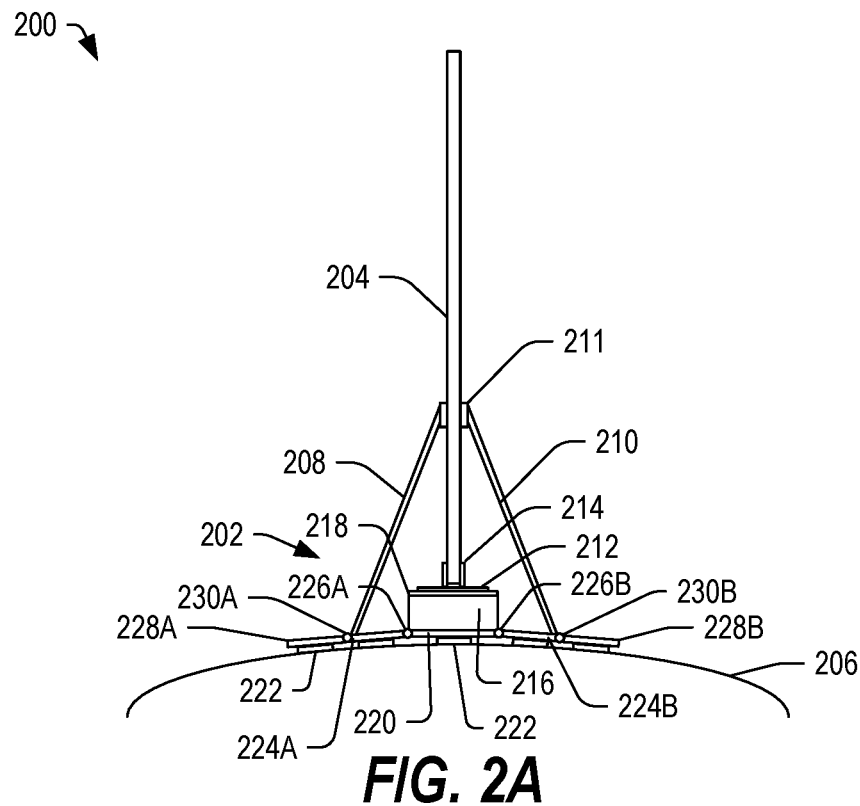
FIG. 2A depicts a front view of a portion of a system including a device mounted to a water tower using a hinged magnetic mounting apparatus, in accordance with certain embodiments of the present disclosure.

FIG. 2A depicts a front view 200 of a portion of a device 204 mounted to a surface 206, such as a surface of a water tower, using a hinged magnetic mounting apparatus 202, in accordance with certain embodiments of the present disclosure. The hinged magnetic mounting apparatus 202 may be an embodiment of the hinged magnetic mounting apparatus 106 of FIG. 1. The device 204 may include a first support arm 208, which may be magnetically coupled to the surface 206 by a hinged magnetic mounting apparatus 202 (not shown). The device 204 may further include a second support arm 210, which may be magnetically coupled to the surface 206 by a hinged magnetic mounting apparatus 202 (not shown). The first support arm 208 and second support arm 210 may be coupled to the device 204 by a coupling element 211. The device 204 may be coupled to a hinge element 214, which may be coupled to a base plate 212.

The hinged magnetic mounting apparatus 202 may include a flange portion 216, which may be coupled to a mounting plate 218 that can be coupled to the base plate 212 of the device 204. The flange portion 216 may further include a base 220 coupled to the structure 206 by a magnet 222. The base 220 may be coupled to a plate 224A by a hinge 226A and to a plate 224B by a hinge 226B. The plate 224A may be coupled to a plate 228A by a hinge 230A, and the plate 224B may be coupled to a plate 228B by a hinge 230B. The plates 224A and 224B and the plates 228A and 228B may be coupled to the surface 206 by magnets 222.

In the illustrated example, the plate 224A may be an intermediate plate having hinge elements on opposing edges, which hinge elements may be configured to engage the flange portion 220, another intermediate plate 224, or an end plate 228. The end plate 228 may include a hinge element on a single edge. It should be understood that, depending on the implementation, the hinged magnetic mounting apparatus 202 may include any number of intermediate plates 224, one of which may be coupled to the flange portion 216.

In certain embodiments, the plates 224 may pivot about the hinges 226 to form an angle relative to a surface of the base 220. By pivoting about the hinges 226, the plates 224 may define planes that extend substantially tangential to the curvature of the surface 206, allowing the magnets 222 to maintain a substantially consistent engagement with the surface 206, even when the surface is curved.

Figure 2B:
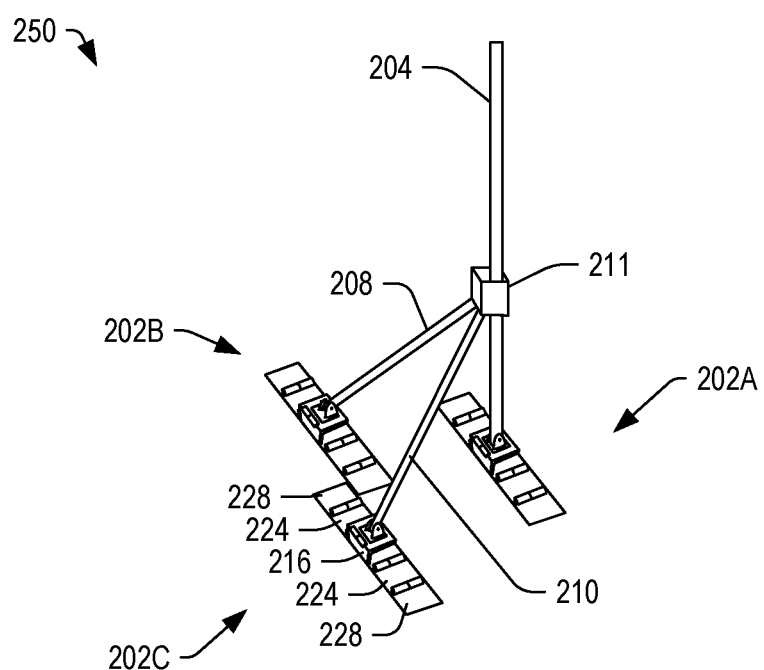
FIG. 2B illustrates a side perspective view of the device of FIG. 2A, in accordance with certain embodiments of the present disclosure.

FIG. 2B illustrates a side perspective view 250 of the device 204 of FIG. 2A, in accordance with certain embodiments of the present disclosure. As shown, the device 204 may include multiple hinged magnetic mounting apparatuses (footings) 202. The support arm 208 may be coupled to a hinged magnetic mounting apparatus 202B, and the support arm 210 may be coupled to a hinged magnetic mounting apparatus 202C. The device 204 may be coupled to the hinged magnetic mounting apparatus 202A.

While the footings or apparatus 202 are depicted as being aligned in substantially the same orientation, it should be appreciate that the hinged magnetic mounting apparatuses 202A, 202B, and 202C may be oriented differently from one another. For example, the hinged magnetic mounting apparatuses 202B and 202C may be oriented at an angle other than zero relative to one another and one or both of the hinged magnetic mounting apparatuses 202B and 202C may be oriented at an angle other than zero relative to the hinged magnetic mounting apparatus 202A. Other embodiments are also possible.

In the illustrated example, the flange portion 216 may include an L-shaped structuring including a base 220 configured to a magnet 222 that may be coupled to a surface 206. At a distal edge of the L-shaped flange portion 216 (i.e., at an edge furthest from the base 220), the flange portion 216 may include a hinge configured to engage a corresponding hinge element of a mounting plate 218. The hinge allows the mounting plate 218 to pivot relative to the hinge to allow for an adjustable angle for mounting the device 204. One possible example of an embodiment of the flange portion 216 including hinge elements on edges of the base 220 and at a distal edge of the L-shaped flange portion 216 is described below with respect to FIGS. 3A-6C.

Figure 3A:
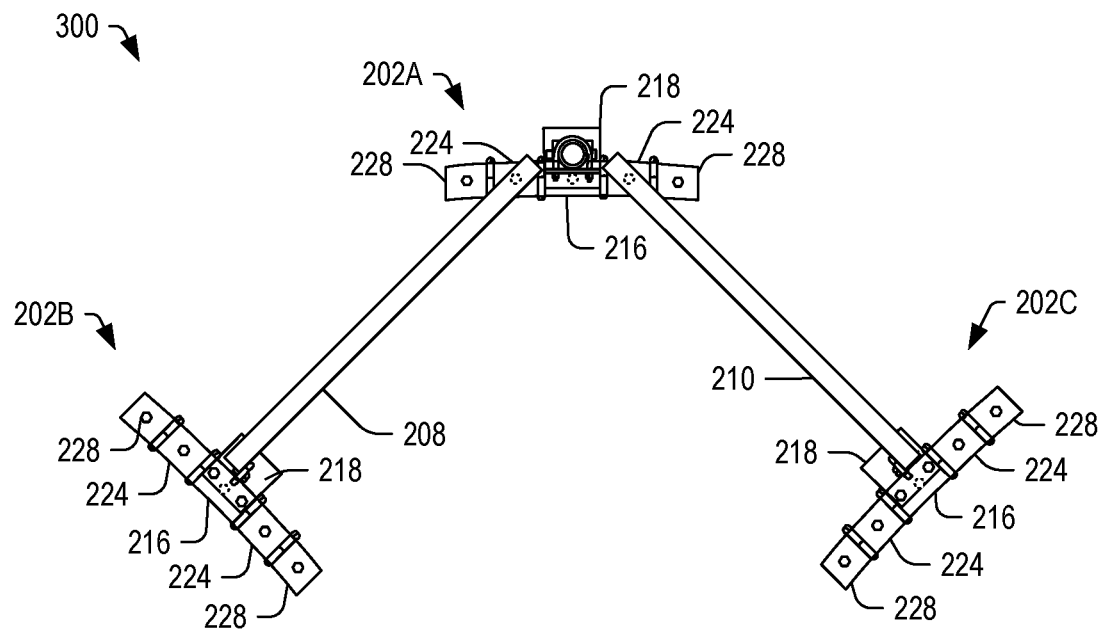
FIG. 3A depicts a top view of a hinged magnetic mounting apparatus, in accordance with certain embodiments of the present disclosure.

FIG. 3A depicts a top view of a hinged magnetic mounting apparatus 300, in accordance with certain embodiments of the present disclosure. The hinged magnetic mounting apparatus 300 may include three magnetic feet 202A, 202B, and 202C, each of which is hinged. Each foot 202 may include a flange portion 216, hinged plates 224, and terminating plates 228.

In the illustrated example, a first foot 202A may include a flange portion 216 coupled to a mounting base 218, which may be configured to couple to a base plate of a device, such as an antenna, a camera, a sensor, a cabinet, another device, another component, or any combination thereof. Further, the flange portion 216 may be coupled to an underlying structure by a magnet (not shown). Further, the flange portion 216 may be coupled to hinged plates 224 on either side, which in turn are coupled to terminating plates 228. The hinges that couple the flange portion 216 to the hinged plates 224 and the hinges that couple the hinged plates 224 to the terminating plates 228 enable the foot 202A to conform to the curvature of the underlying surface, while enabling each magnet to contact the underlying surface.

The hinged magnetic mounting apparatus 300 may further include a second foot 202B and a third foot 202C. The second foot 202B may include a flange portion 216 including a mounting plate 218 configured to couple to a support arm 208 of the device. Further, the flange portion 216 may be coupled to the hinged plates 224 to the terminating plates 228. Similarly, the third foot 202C may include a flange portion 216 including a mounting plate 218 configured to couple to a support arm 210 of the device. Further, the flange portion 216 may be coupled to the hinged plates 224 to the terminating plates 228. The hinges enable the magnets to contact the underlying surface to provide a strong connection.

In some embodiments, a foot 202 may include two flange portions 216 in parallel and may include additional hinged plates 224 and terminating plates 228. In an example, the flange portion 216 may be coupled to a second flange portion as described below in FIG. 3B.

Figure 3B:
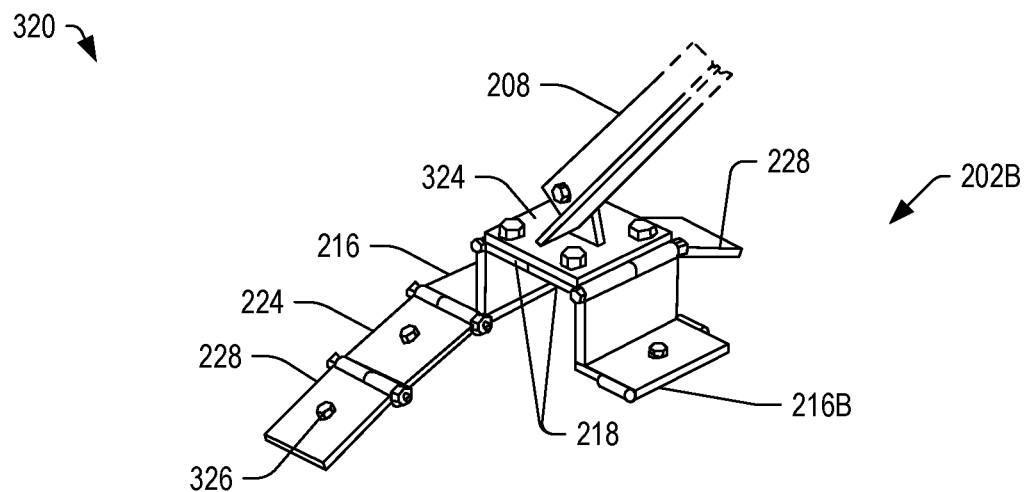
FIG. 3B depicts a perspective view of a hinged magnetic mounting apparatus including a flange portion configured to provide a dual attachment, in accordance with certain embodiments of the present disclosure.

FIG. 3B depicts a perspective view of a portion of a hinged magnetic mounting apparatus 320 including a flange portion configured to provide a dual attachment, in accordance with certain embodiments of the present disclosure. The portion may be an example of the foot 202B of FIG. 3A, for example. In the illustrated example, the flange portion 216 may be coupled to a second flange portion 216B by aligning their respective mounting plates 218 and coupling a base plate 324 to the mounting plates 218 by bolts. The support arm 208 may be coupled to the base plate 324. Further, bolts 326 are provided in each plate to couple the magnet to the plate, such that the magnet is secured against the plate and between the plate and the underlying surface.

During installation, the second flange portion 216B may provide additional support to facilitate the installation process. Further, it should be appreciated that additional hinged plates 224 and terminating plates 228 may be coupled the flange portion 216B. Additionally, it should be appreciated that such additional flange portions 216 and optional hinged plates 224 and terminating plates 228 may be provided for any or all of the footings 202. Other embodiments are also possible.

In the illustrated example of FIGS. 3A and 3B, a tri-pod arrangement is shown, which may be magnetically mounted on a top surface or on a lateral surface of a water tower or other metallic structure. The hinges may be secured to one another by a bolt or pin that extends through the hinges of adjacent plates. Further, the bolt or pin may be secured in place by a locking nut. In the illustrated example, the hinges enable the magnets to contact the underlying curved surface. Other embodiments are also possible.

Unlike conventional approaches, where one or more magnets of the mounting structure do not solidly contact the mounting surface because the mounting structure does not conform to the shape of the underlying surface, the hinges of the mounting structures depicted in FIGS. 1-3B enable coupling between the mounting structure and a curved surface. Further, unlike structures that rely on flexibility of the bolt to allow the magnet to float and to establish a flush contact, the magnets of the present disclosure are in contact with the plates 228, 224, or 216 on one side and in contact with the underlying surface on the other side. By securing the magnets in a contact configuration, shearing forces on the bolts are reduced, enhancing the longevity of the mounting structure.

Figure 4A:
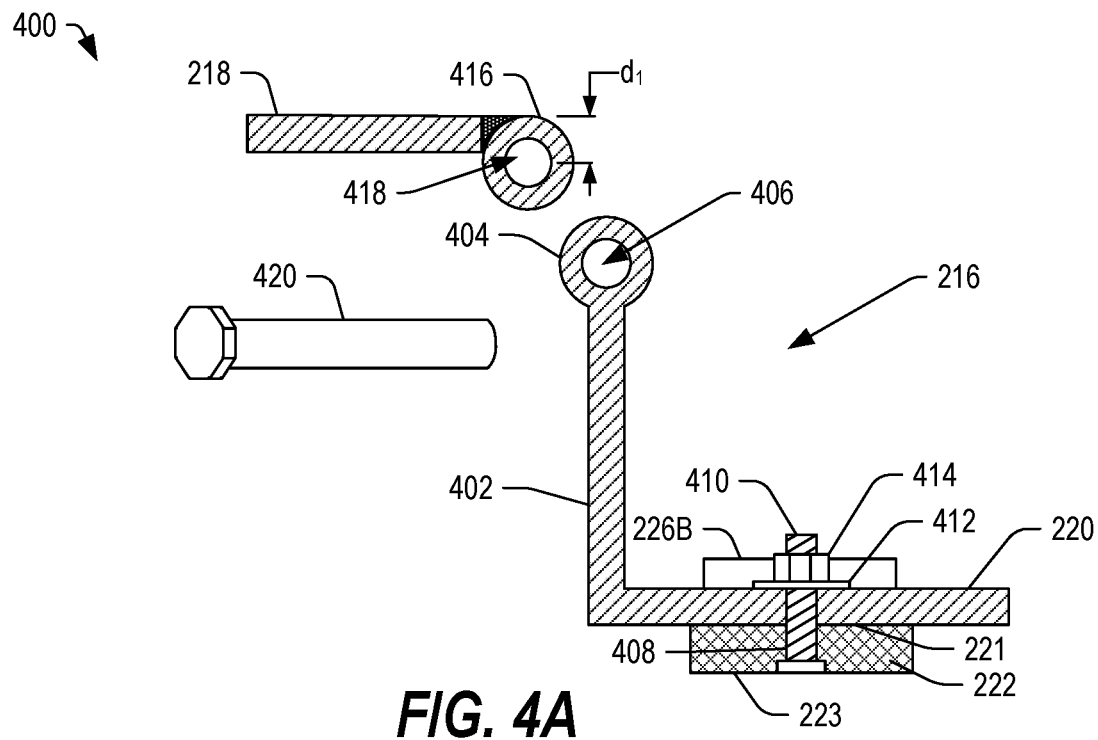
FIG. 4A depicts a side cross-sectional view of a flange portion of the hinged magnetic mounting apparatus, in accordance with certain embodiments of the present disclosure.

FIG. 4A depicts a side cross-sectional view 400 of a flange portion 216 of the hinged magnetic mounting apparatus 202 (of FIGS. 1-3B), in accordance with certain embodiments of the present disclosure. The flange portion 216 may include a base 220 and a sidewall 402, which may be welded together at a weld joint or which may be integrally formed from a single sheet of metal. At a distal end of the sidewall 402, the flange portion 216 may include a hinge element 404 (sometimes referred to as a knuckle) including an opening 406 sized to receive a pin or bolt.

Further, the base 220 of the flange portion 216 may include an opening sized to receive a bolt 410, which may extend through an opening 408 in a magnet 222. A washer 412 and a nut 414 may be coupled to the bolt 410 to secure the magnet 222 to the base 220. In the illustrated example, the magnet 222 may include a first surface 221 in contact with an underside of the base 220 and a second surface 223 configured to contact the underlying surface.

The flange portion 216 may be coupled to a mounting plate 218, which may include a hinge element 416 (such as knuckles corresponding to the knuckle of the sidewall 402) including an opening 418. The hinge element 416 may be sized to engage the hinge element 404 of the flange portion 216. In an example, the hinge elements 418 and 404 may be fitted together such that the openings 406 and 418 may be aligned, and a bolt or pin 420 may be inserted through the openings 406 and 418 to secure the mounting plate 218 to the flange portion 216. The mounting plate 218 may pivot about a pivot axis defined by the bolt or pin 420 to orient the mounting plate 218 at a selected angle relative to the base 220. The hinge element 416 may be offset from a center of the mounting plate 218 to facilitate the connection and to allow for a greater range of pivoting motion in before the undersurface of the mounting plate 218 contacts the sidewall 402.

Figure 4B:
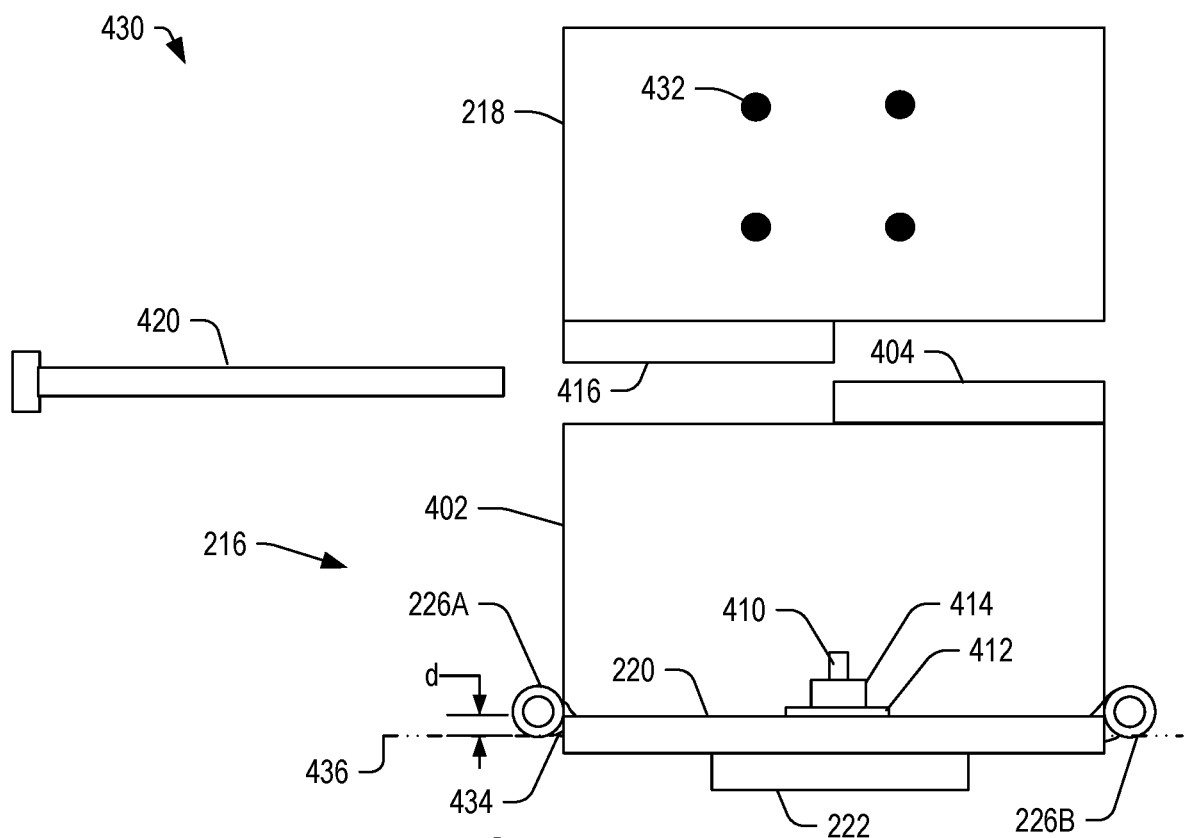
FIG. 4B depicts a front view of the hinged magnetic mounting apparatus of FIG. 4A including a hinge that is offset from a center of a base portion of the flange, in accordance with certain embodiments of the present disclosure.

FIG. 4B depicts a front view 430 of the flange portion 216 of the hinged magnetic mounting apparatus 202 of FIG. 4A including a hinge that is offset from a center of a base portion of the flange, in accordance with certain embodiments of the present disclosure. In the illustrated example, the flange portion 216 includes a single hinge element 404 coupled to a distal edge of the sidewall 402. The hinge element 404 may be configured to engage the hinge element 416 associated with an edge of the mounting plate 218. The mounting plate 218 may include a plurality of openings 432 configure to engage bolts associated with the base or mounting base of a device 404, such as an antenna, a camera, a sensor, a light, a cabinet, another device, another component, or any combination thereof. In some embodiments, a pin or bolt 420 may be inserted through the hinge elements 404 and 416 to couple the mounting plate 218 to the flange portion 216. The hinge elements 404 and 416 and the pin or bolt 420 may cooperate to provide an adjustable angle between the mounting plate 218 and sidewall 402 of the flange portion 216.

The base 220 may include hinge elements 226A and 226B, which may be configured to engage corresponding hinge elements of a plate 224 or 228. Further, the base 220 may be coupled to a magnet 222 via a bolt 410, washer 412, and nut 414. In the illustrated example, the hinge elements 226 may be offset from a center axis 436 of the base 220 by an offset distance (d), making it easier to insert and remove a bolt to couple the base 220 to a plate 224 or 228, at least in some implementations. In some embodiments, such as the embodiment described below with respect to FIG. 5, the hinge elements 226 may be aligned to the center axis or the offset may be within a margin of error according to manufacturing tolerances (such as the slight offset "d"). Other embodiments are also possible.

Figure 5:
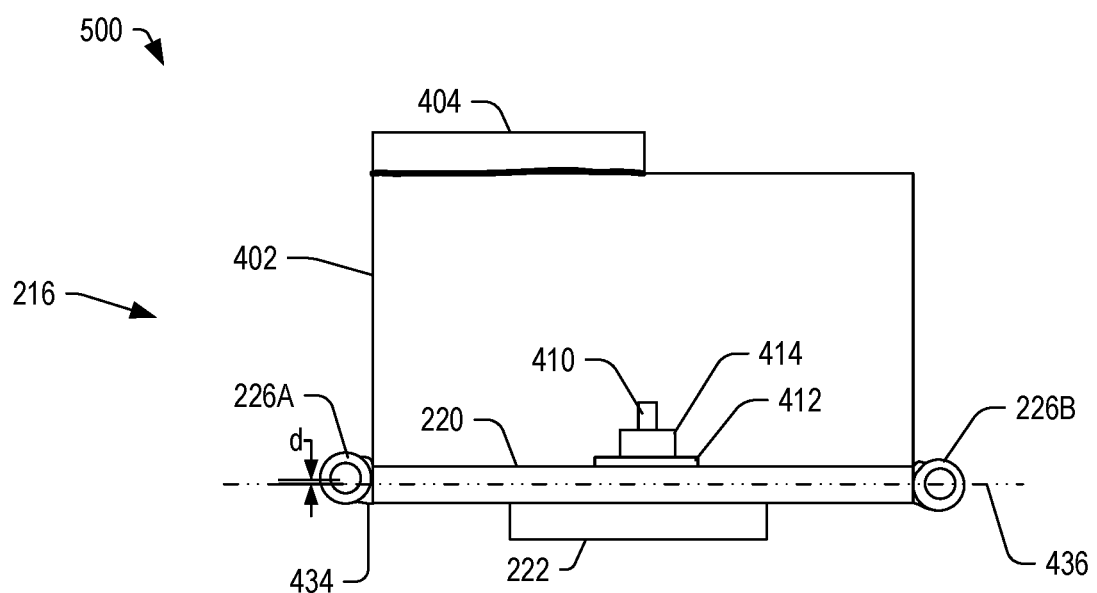
FIG. 5 depicts a front view of the flange portion of the hinged magnetic mounting apparatus of FIG. 4A including the hinges offset from a center of a base portion of the flange, in accordance with certain embodiments of the present disclosure.

FIG. 5 depicts a front view 500 of the flange portion 216 of the hinged magnetic mounting apparatus 202 of FIG. 4A including the hinge elements 226 substantially aligned to a center axis 402 of a base 220 of the flange portion 216, in accordance with certain embodiments of the present disclosure. The hinge elements 226A and 226B may be substantially aligned to the center axis 402 or may be slightly offset above or below the center axis, according to manufacturing tolerances. In the illustrated example, the offset (d) is less than the offset (d) in FIG. 4B. In some examples, the hinge elements 226A and 226B may be offset by different amounts or may be precisely aligned to the center axis.

In certain embodiments, depending on the implementation, the amount of the offset may be selected during manufacturing to facilitate coupling of the flange portion 216 to selected plates 224 and 228. Further, the plates 224 and 228 may be fabricated with corresponding offsets to facilitate the hinged engagement of adjacent components.

In a particular example, the hinges on the sidewall 402 and edges of the flange portion 216 and the hinges on the edges of the hinged plates 224 and the terminating plates 228 may be aligned with a center axis (such as the center axis 436). The hinge 416 on the mounting plate 218 may be offset by a distance ($d_1$). Other embodiments are also possible.

Further, in FIG. 5, the magnet 222 is shown in contact with the base plate 220 of the flange portion 216. The magnet 222 may directly contact the underlying surface on a side opposite to the base plate 220. The hinges 226A and 226B cooperate with corresponding hinges of the hinged plates 224 or the terminating plates 228 to conform to a shape of the underlying surface so that magnets associated with the hinged plates 224 and the terminating plates 228 are similarly sandwiched between the plate and the underlying surface.

Figure 6A:
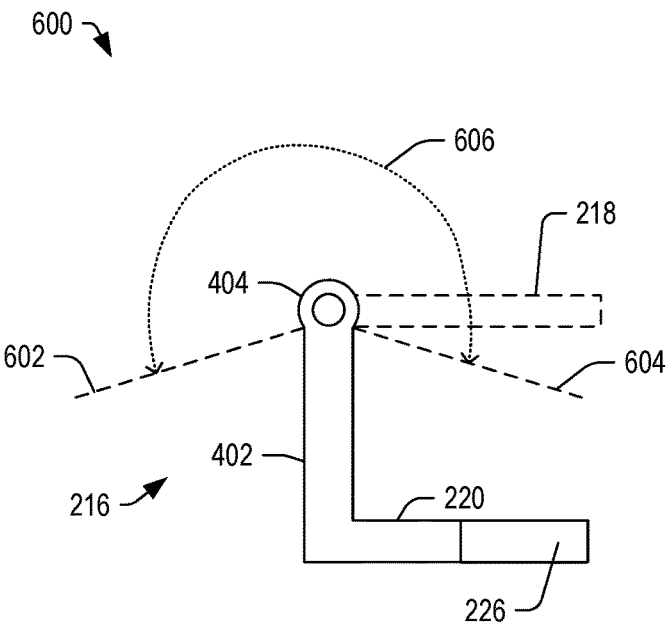
FIG. 6A depicts a side view of the flange portion of the hinged magnetic mounting apparatus of FIG. 4A and including a mounting plate coupled to a vertical portion of the flange portion by a hinge, in accordance with certain embodiments of the present disclosure.

FIG. 6A depicts a side view 600 of the flange portion 216 of the hinged magnetic mounting apparatus 202 of FIG. 4A and including a mounting plate 218 coupled to a vertical portion (sidewall 402) of the flange portion 216 by a hinge 404, in accordance with certain embodiments of the present disclosure. In some embodiments, the mounting plate 218 may be configured to pivot about the hinge 404 along an arc 606 extending from a first position 602 to a second position 604. An edge of the mounting plate 218 may contact the sidewall 402 when the mounting plate 218 is aligned to either the first position 602 or the second position 604, preventing the mounting plate 218 from pivoting further.

Thus, the sidewall 402 may present a stop for the hinged mounting plate 218. The flange portion 216 further includes a base 220 that includes hinges 226. In the illustrated example, the hinge 226 is on an edge of the base 220 and aligned with a center axis of the base. Further, the hinge 226 extends approximately half of a length of the edge and is positioned on a portion of the edge at a distance from the sidewall 402. Other embodiments are also possible.

In certain embodiments, the hinged mounting plate 218 may provide an adjustable mounting surface for coupling the device 104 to the hinged magnetic mounting apparatus 202. When mounting the device 104 onto a curved surface that is sloped in a direction of the base, for example, it may be desirable to adjust the hinged mounting plate 218 to orient the device at an angle relative to the surface. Other embodiments are also possible.

Figure 6B:
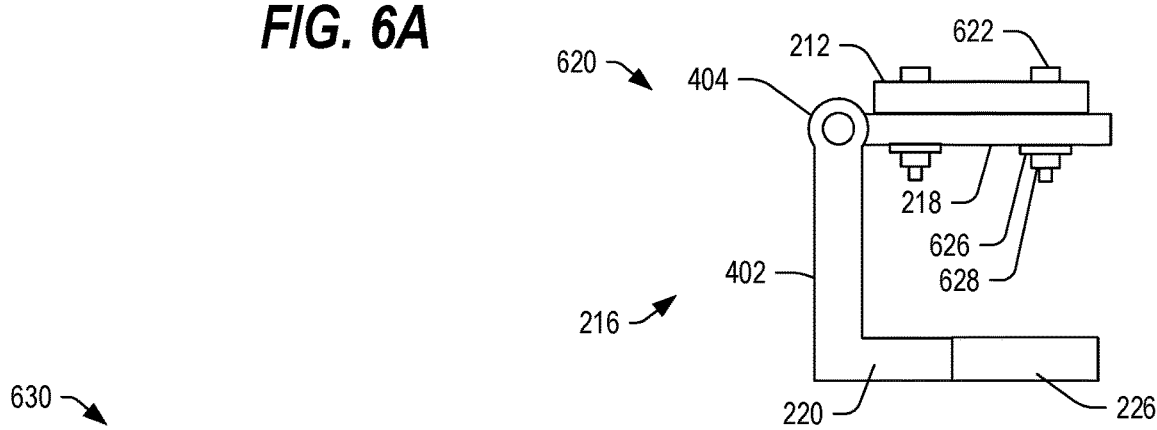
FIG. 6B depicts a side view of the flange portion and mounting plate of FIG. 6A and including an attached base plate of a device, in accordance with certain embodiments of the present disclosure.

FIG. 6B depicts a side view 620 of the flange portion 216 and mounting plate 218 of FIG. 6A and including an attached base plate 212 of a device, in accordance with certain embodiments of the present disclosure. In this example, the hinged mounting plate 218 may be positioned at an angle of approximately ninety degrees (90°) relative to the sidewall 402. Other angles are also possible, depending on the selected installation. In certain embodiments, the attached base plate 212 may be coupled to the hinged mounting plate 218 by bolts 622, a washer 626, and a nut 628. Further, the attached base plate 212 may be coupled to a base plate of a device, such as an antenna, a camera, a sensor, a light, a cabinet, another device, another structure, or any combination thereof.

In this example, a single flange portion 216 may be used to mount the device to a structure. However, in some embodiments, multiple flange portions 216 may be used in combination to mount the device. One possible example of such an embodiment is described below with respect to FIG. 6C.

Figure 6C:
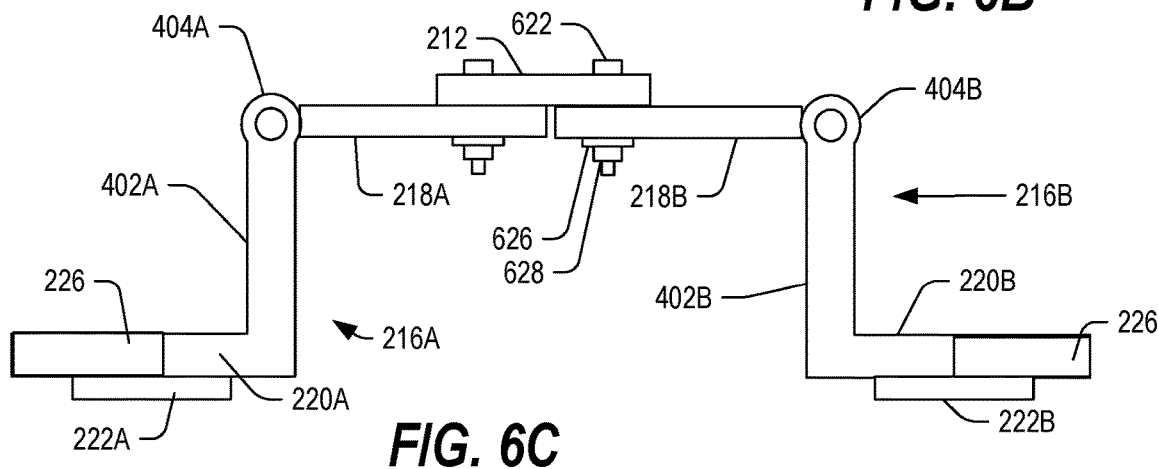
FIG. 6C depicts a side view of a pair of flange portions and mounting plates of FIG. 6A and including an attached base plate of a device, in accordance with certain embodiments of the present disclosure.

FIG. 6C depicts a side view 630 of a pair of flange portions 216A and 216B and mounting plates 218A and 218B of FIG. 6A and including an attached base plate 212 of a device, in accordance with certain embodiments of the present disclosure. In the illustrated example, the hinged mounting plates 218A and 218B may be pivoted about the hinges 404A and 404B, respectively, to be in a substantially parallel configuration and to point toward one another. The attached base plate 212 may couple to openings in both of the hinged mounting plates 218A and 218B to secure the attached base plate 212 to the mounting plates 218A and 218B and to secure the flange portions 216A and 216B to one another.

In the illustrated example, the attached base plate 212 is small relative to the mounting plates 218; however, other sizes of attached base plates 212 may be used, depending on the structure of the device. Other embodiments and other configurations are also possible.

Figure 7A:
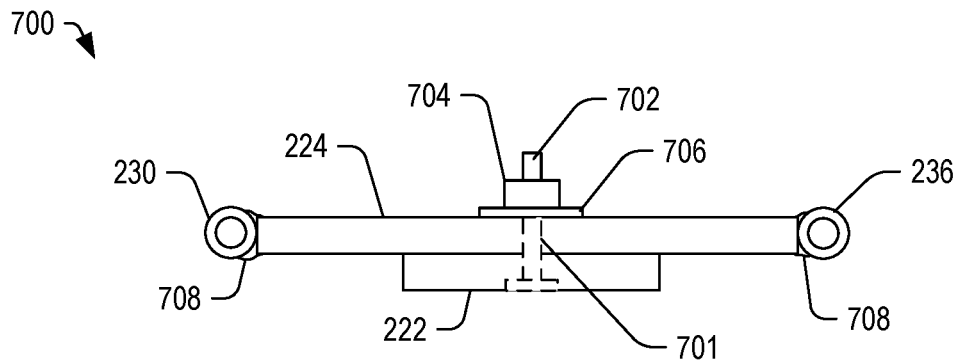
FIG. 7A depicts a side view of a hinged plate of a hinged magnetic mounting apparatus, in accordance with certain embodiments of the present disclosure.

FIG. 7A depicts a side view 700 of a hinged plate 224 of a hinged magnetic mounting apparatus, in accordance with certain embodiments of the present disclosure. The hinged plate 224 may sometimes be referred to as an "extension" plate. The hinged plate 224 may include hinges 230 and 236 on opposing edges, which may be coupled to the hinged plate 224 by welds 708. Further, the hinged plate 224 may include an opening 701 sized to receive a fastener 702 to secure a magnet 222 to the hinged plate 224. The fastener 702 may be secured by a washer 706 and a nut 704.

In the illustrated example, the hinged plate 224 may include hinges 226 and 230 on opposing edges. Any number of hinged plates may be changed together by their respective hinges, incrementally increasing the magnetic holding power of the resulting assembly (based on the strength of the magnet used). In some embodiments, another type of hinged plate may include a hinge on only one edge. Such plates may terminate a chain of magnetic plates. In other embodiments, the terminating plate 228 may be a hinged plate 224 where one of the hinges is left open or unused.

Figure 7B:
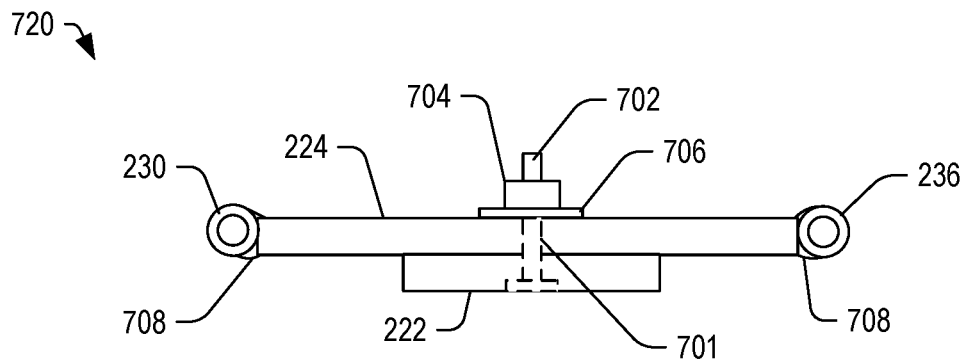
FIG. 7B illustrates a side view of a hinged plate including hinges offset from a center, in accordance with certain embodiments of the present disclosure.

FIG. 7B illustrates a side view 720 of a hinged plate 224 including hinges 230 and 226 offset from a center, in accordance with certain embodiments of the present disclosure. In certain embodiments, the offset of the hinges 226 and 230 may make it easier to install the pin to couple the hinged plate 224 to the flange portion 216 or to another hinged plate 224 or a terminating plate 228. In other embodiments, the hinges 230 and 226 may be aligned to the center of the plate 224. Other embodiments are also possible.

Figure 7C:
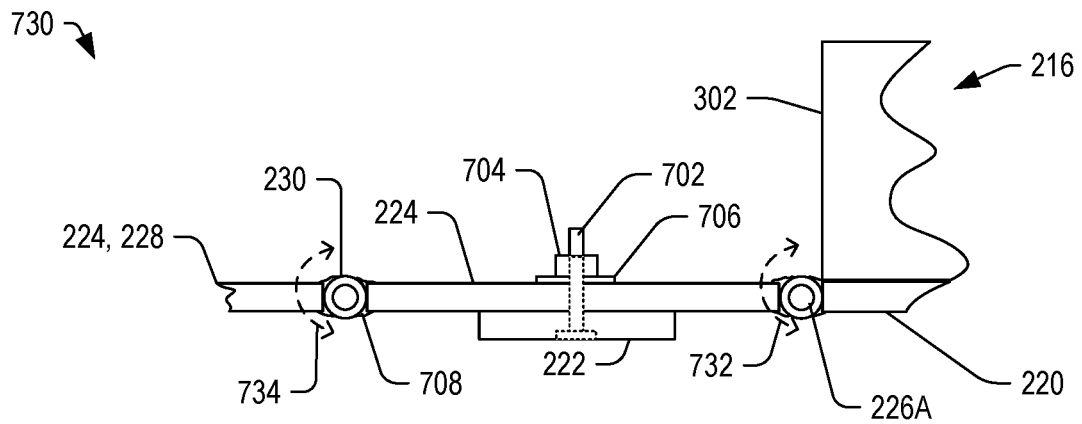
FIG. 7C depicts a side view of a hinged magnetic mounting apparatus, in accordance with certain embodiments of the present disclosure.

FIG. 7C depicts a side view 730 of a hinged magnetic mounting apparatus, in accordance with certain embodiments of the present disclosure. The hinged mounting apparatus may include a flange portion 216 including a sidewall 402 and a base plate 220, which may be coupled to a hinged plate 224 by a hinge 226A. The hinged plate 224 may be configured to pivot about the hinge 226A, as generally indicated by the dashed arrow 732. Similarly, at a distal edge of the hinged plate 224, the hinged plate 224 may be coupled to an adjacent hinged plate 224 or a terminating plate 228 by a hinge 230. The hinged plate 224 or terminating plate 228 may pivot about the hinge 230 relative to the hinged plate 224 that is coupled to the flange portion 216, as generally indicated by the dashed arrow 734.

In certain embodiments, the flange portion 216 and each hinged plate 224 or terminating plate 228 may be coupled to a permanent magnet 222, which may be configured to secure the assembly to a metallic structure, such as a water tower, a metal roof, etc. In some embodiments, the permanent magnet 222 may provide approximately 250 pounds of magnetic holding force.

In an example, by coupling the flange portion 216 to one or more hinged plates 224 and 228, a magnetic assembly may be formed that can be configured to secure a device (which may have a selected weight) to a structure, even if the surface of the structure is irregular, curved, concave, and so on. The hinges 226 and 230 enable the plates 220, 224, and 228 to fit to the surface of the structure, ensuring a tight magnetic fit between the magnet 222 and the surface.

Figure 8:
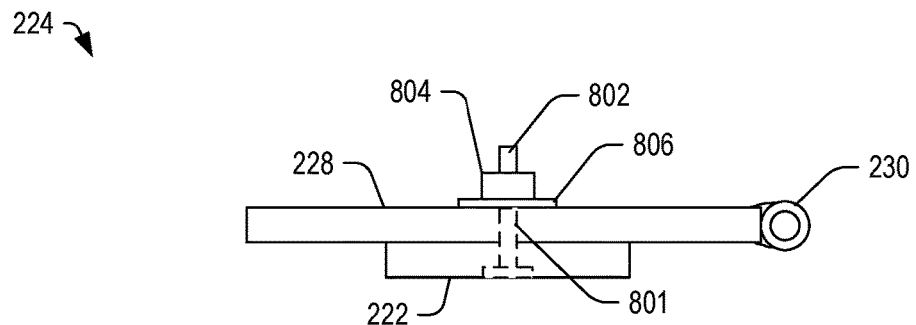
FIG. 8 depicts a side view of a hinged plate of a hinged magnetic mounting apparatus, in accordance with certain embodiments of the present disclosure.

FIG. 8 depicts a side view of a hinged plate or terminating plate 228 of a hinged magnetic mounting apparatus, in accordance with certain embodiments of the present disclosure. The terminating plate 228 includes a hinge 230 on a first edge and no hinge on a second opposing edge. Like the hinged plate 224, the terminating plate 228 includes an opening 801 sized to receive a fastener 802, which may secure a magnet 222 to the terminating plate 228 via a washer 806 and a nut 804.

Figure 9A:
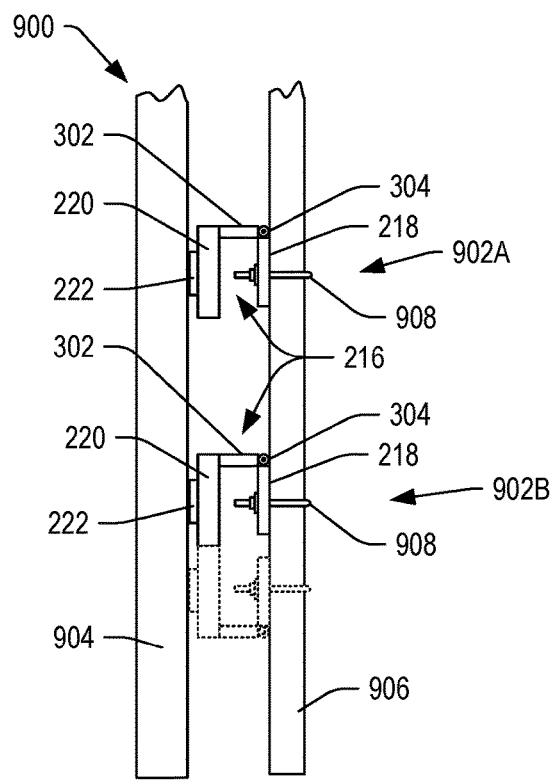
FIG. 9A depicts a side view of a system including a hinged magnetic mounting apparatus coupled to a vertical surface, in accordance with certain embodiments of the present disclosure.

FIG. 9A depicts a side view of a system 900 including a hinged magnetic mounting apparatus 902 coupled to a vertical surface 904, in accordance with certain embodiments of the present disclosure. The system includes a first hinged magnetic mounting apparatus 902A and a second hinged magnetic mounting apparatus 902B, each of which includes a U-shaped bolt 908 configured to couple to the mounting plate 218 to secure a post or pole 906 to the surface 904. The U-shaped bolt 908 may include a fastener on opposing ends that may fit through openings in the mounting plate 218. The U-shaped bolt 908 may be positioned over the pole 906 with the fastener ends extending through the openings where they can be secured using a washer and a nut as previously described with respect to the fasteners 622 in FIGS. 6B-6C, for example. By tightening nuts on the ends of the U-shaped bolt 908, the U-shaped bolt 908 may apply a pressure to a portion of the post or pole 906 and to press the post or pole 906 against a surface of the mounting plate 218.

In the illustrated example, the hinged plates 224 and terminating plates 228 are omitted for simplicity of the visual depiction; however, any number of hinged plates 224 and terminating plates 228 may be coupled to the flange portion 216 to provide coupling strength for the mounting apparatus 902 with respect to the surface 904. Further, while two magnetic mounting assemblies 902A and 902B are shown, it should be appreciated that additional magnetic mounting assemblies may be provided, which may be coupled to the pole 906 and to the structure 904. In some instances, the additional magnetic mounting structures may be coupled to support arms associated with the pole 906.

Further, in the illustrated example, two flange portions 216 may be coupled to the surface 904 adjacent to one another, and two U-shaped bolts 908 may extend about the post or pole 906 and couple to corresponding mounting plates 218 to secure the post 906 to the surface 904. In this example, the second flange portion 216 is depicted in phantom to indicate that it may be omitted. Other embodiments are also possible.

Figure 9B:
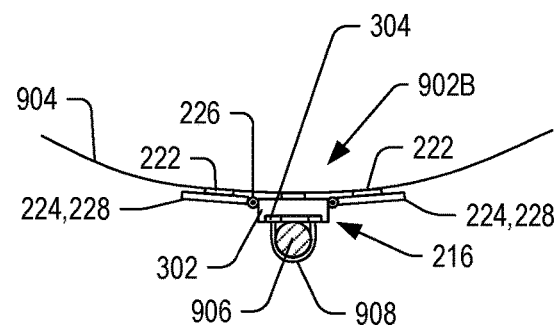
FIG. 9B depicts a top view of a portion of the system of FIG. 8A, in accordance with certain embodiments of the present disclosure.

FIG. 9B depicts a top view of a portion of the system 900 of FIG. 9A, in accordance with certain embodiments of the present disclosure. In this view, the U-shaped bolt 908 secures the pole 906 to the flange portion 216. Additional mounting plates 224 and 228 may be coupled by hinges 226 to the flange portion 216 and may be coupled by magnets 222 to the curved surface 904. The hinges 226 make it possible to produce a tight magnetic fit between each of the magnets 222 to the surface 904. Other embodiments are also possible.

Figure 9C:
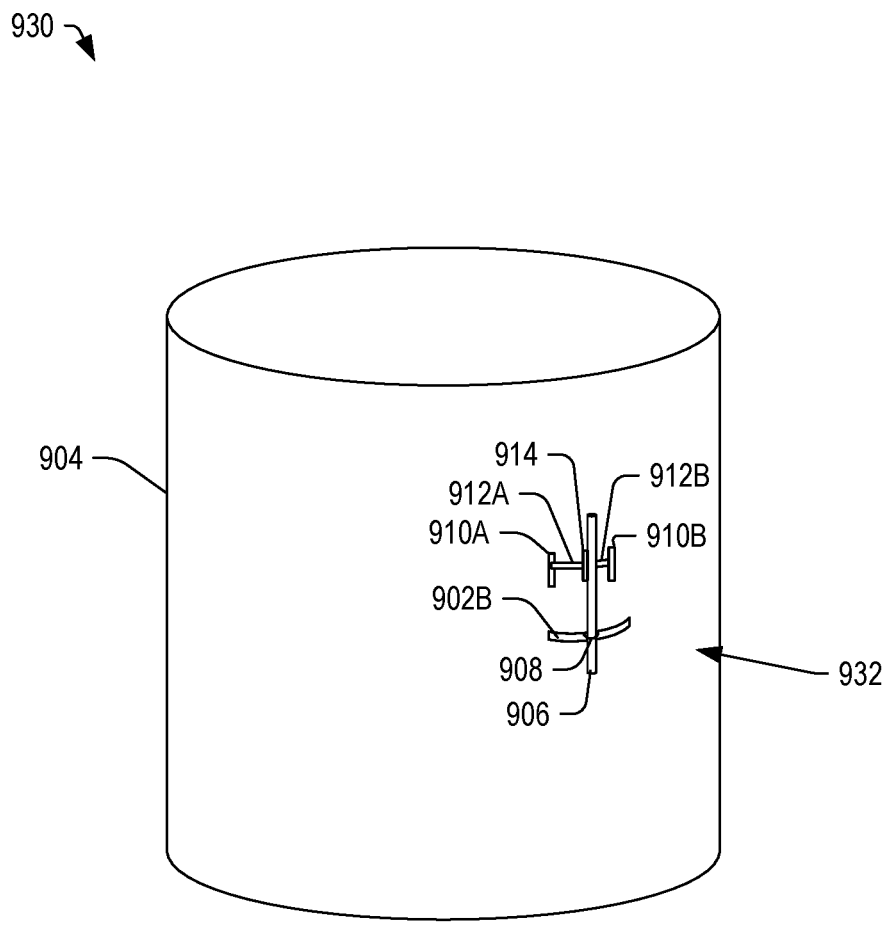
FIG. 9C depicts a perspective view of a system including a hinged magnetic mounting apparatus to couple a device to a vertical surface, in accordance with certain embodiments of the present disclosure.

FIG. 9C depicts a perspective view 930 of a system 932 including a hinged magnetic mounting apparatus to couple a device to a vertical surface, in accordance with certain embodiments of the present disclosure. The system 932 may be coupled to a curved surface 904, which may be a substantially cylindrical surface. The system 932 includes a first magnetic mounting assembly 902B, which may include a U-shaped bolt 906 configured to secure a post 908 to the assembly 902B. Further, the system 932 may include a pair of support arms 912A and 912B, which may be coupled to the post 906 by a frame 914. Further, the support arms 912A and 912B may be coupled to the surface 904 by magnetic assemblies 910A and 910B, respectively.

In certain embodiments, the magnetic assemblies 910A and 910B and the magnetic assembly 902B may be embodiments of the magnetic assemblies and associated components described above with respect to FIGS. 1-9B. Other embodiments and other configurations of hinged magnetic plates may also be used. Examples of alternative configurations are described below with respect to FIGS. 10A-10B.

Figure 10A:
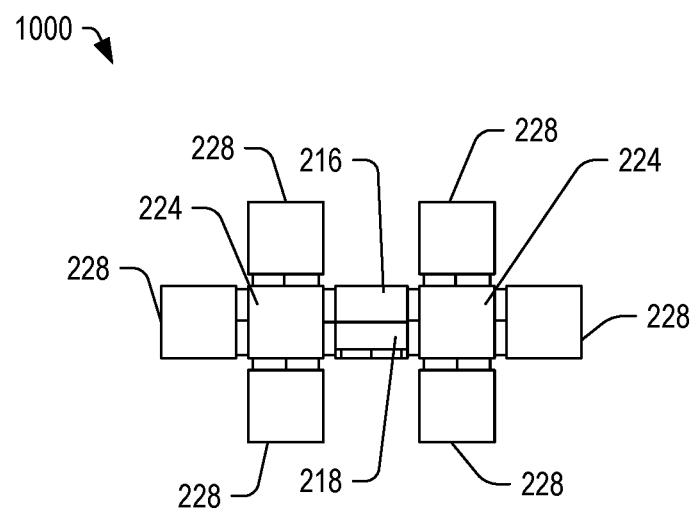
FIG. 10A depicts a top view of a hinged magnetic mounting apparatus, in accordance with certain embodiments of the present disclosure.

FIG. 10A depicts a top view of a hinged magnetic mounting apparatus 1000, in accordance with certain embodiments of the present disclosure. The apparatus 1000 may include a flange portion 216 and hinged plates 224 coupled to hinges on opposing edges of the flange portion 216. Further, in the illustrated example, each hinged plate 224 may include knuckles or hinge elements on each edge, one of which is coupled to corresponding knuckles or hinge elements of the flange portion 216. Further, the other edges of the hinged plate 224 may be coupled to one or more terminating plates 228.

In the illustrated example, the flange portion 216 may be coupled to two hinged plates 224, each of which may be coupled to three terminating plates 228. If the portion 216, the hinged plates 224, and the terminating plates 228 are each coupled to a surface by a 250 pound magnet, the assembly may have attachment strength of approximately 2,250 pounds. While only one hinged plate 224 is shown, it should be appreciated that a plurality of hinged plates 224 and terminating plates 228 may be used to achieve a selected configuration and a selected magnetic attachment strength.

It should be appreciated that the pins or bolts that couple the hinge elements of the hinged plates 224 and the terminating plates 228 may include a head or other feature that may be accessible to a tool to tighten the plates together. To allow access to for the tool, the hinge elements may be inset from the edges of the plate such that the pin or bolt is flush with or inset from the edge to allow room for the tool to access the pin or bolt. In other embodiments, the hinge elements may be provided on opposing edges of the plates. One possible example of the hinge elements on opposing edges of the plates is described below with respect to FIG. 10B.

Figure 10B:
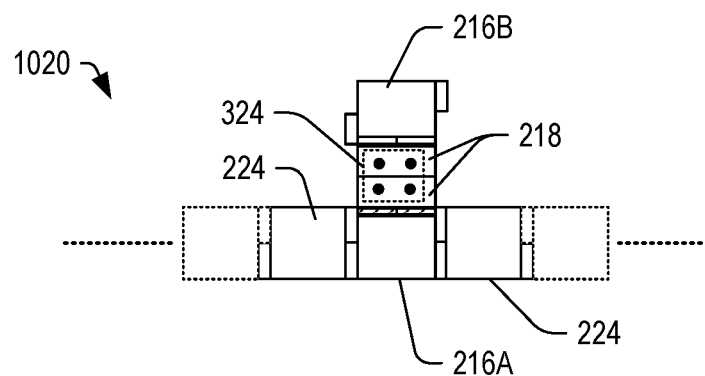
FIG. 10B depicts a top view of a hinged magnetic mounting apparatus, in accordance with certain embodiments of the present disclosure.

FIG. 10B depicts a top view of a hinged magnetic mounting apparatus 1020 showing an alternative configuration, in accordance with certain embodiments of the present disclosure. In this example, hinged plates 224 may be coupled to the flange portion 216A on opposing sides. Multiple additional plates may be coupled to the hinged plates 224 and the flange portion 216 to provide a selected strength. Further, the flange portion 216A may be coupled to a second flange portion 216B. Each flange portion 216A and 216B may be coupled by a hinge to a mounting plate 218. The mounting plates 218 may be coupled to one another and to a mounting base 324 of a device. In this example, each plate 224 and each flange portion 216 (and optionally each terminating plate 228) may be coupled to an underlying structure (such as a metallic surface) by a single magnet that may be bolted to the plate. In this example, if each magnet holds 250 pounds, the assembly 1020 may have a magnetic strength of approximately 1,500 pounds of attachment force. Other sizes of magnets and other configurations of flange portions 216, hinge plates 224 and terminating plates 228 may be used, depending on the structural needs and other mounting considerations. By increasing or decreasing the number of plates 224 and 228 and their associated magnets, the magnetic holding strength of the mounting apparatus can be adjusted. Further, by adjusting the strength of the magnets, the magnetic holding strength can also be adjusted.

Figure 11:
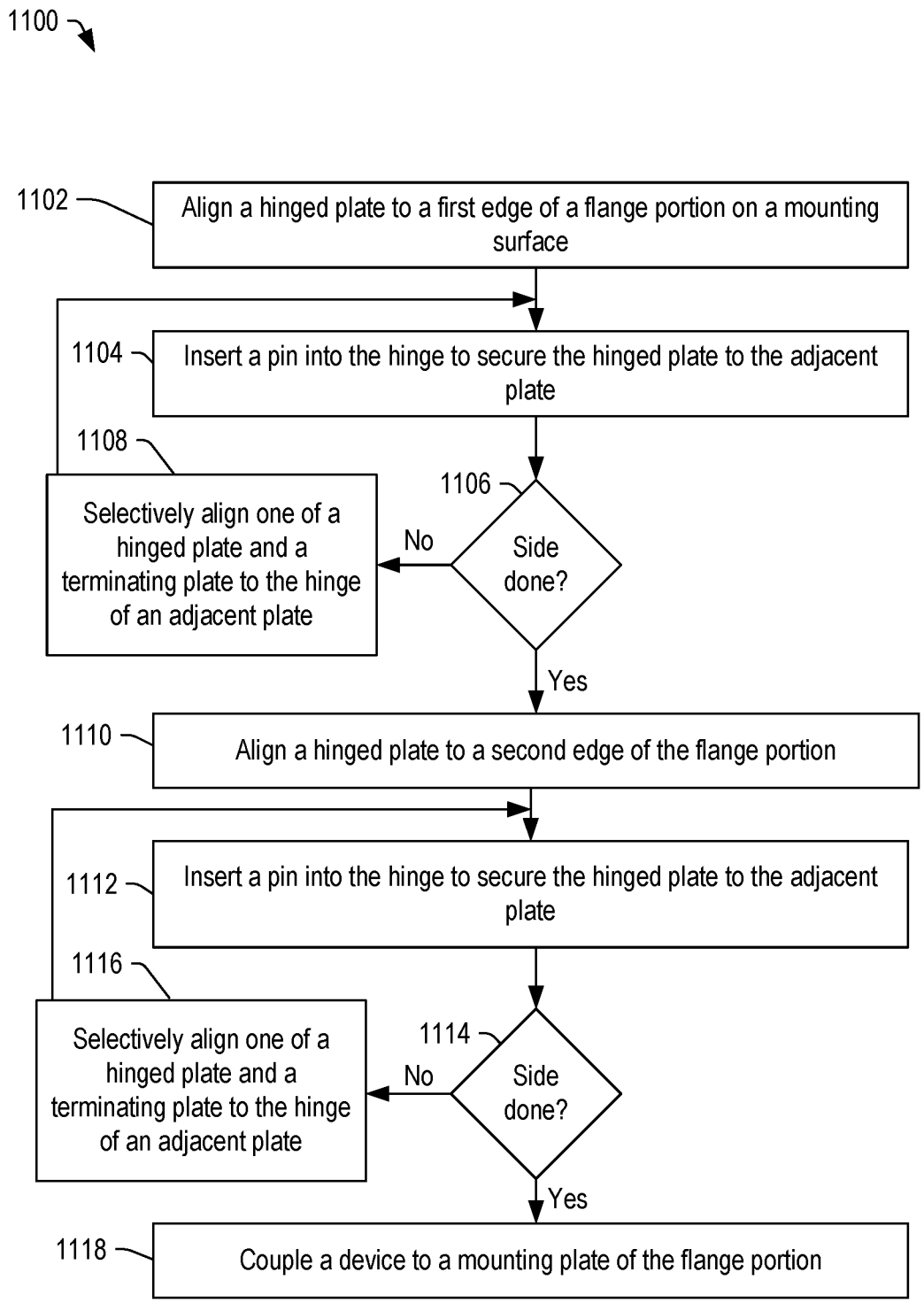
FIG. 11 illustrates a method of assembling a magnetic mounting assembly, in accordance with certain embodiments of the present disclosure.

FIG. 11 illustrates a method 1100 of assembling a magnetic mounting assembly, in accordance with certain embodiments of the present disclosure. At 1102, the method 1100 may include aligning a hinged plate to a first edge of a flange portion on a mounting surface. Because the magnets of each of the hinged plates and the flange portions may be quite strong, it may be desirable to place an insulating layer between the magnet and the surface to enable or facilitate placement during installation. Otherwise, the magnet may latch on to the surface and become extremely difficult to adjust.

At 1104, the method 1100 may include inserting a pint into the hinge to couple the hinged plate to the adjacent plate (e.g., flange portion or hinged plate). At 1106, if the side is not done, the method 1100 includes selectively aligning one of a hinged plate and a terminating plate to the hinge of an adjacent plate, at 1108. The method 1100 returns to 1104 to insert a pin into the hinge.

Otherwise, at 1106, if the side is done, the method 1100 may include aligning a hinged plate to a second edge of a flange portion, at 1110. At 1112, the method 1100 may include inserting a pin into the hinge to secure the hinged plate to the adjacent plate. At 1114, if the side is not done, the method 1100 may include selectively aligning one of a hinged plate and a terminating plate to the hinge of an adjacent plate, at 1116. The method 1100 may return to 1112 to insert a pin into the hinge.

Otherwise, at 1114, if the side is done, the method 1100 may include coupling a device to a mounting plate of the flange portion. In some embodiments, if an insulating layer was used, the insulating layer may be removed to secure the magnetic assembly to a structure before coupling the device to the mounting plate. Other embodiments are also possible.

In particular embodiments, the design professional may determine the weight requirements of the system and may design the magnetic assembly to provide a mounting strength sufficient to satisfy the system's requirements. In some embodiments, by coupling mounting plates to each other and to the edges of the flange portion by hinges and associated pins, the assembly may be provided with a selected magnetic strength and a selected configuration to fit the curvature or space limitations of a selected structure.

In conjunction with the assemblies, apparatuses, components, systems, and methods described above with respect to FIGS. 1-11, a hinged magnetic mounting assembly is disclosed that includes a plurality of plates coupled by hinges and mounted to a surface by magnets. Each plate is coupled to the surface by a magnet, and coupled to at least one other plate by a hinge. The strength of the mounting assembly may be adjusted by increasing the number of plates, where each plate has an associated magnet and is coupled by a hinge to an adjacent plate. Further, in some embodiments, a device may be coupled to a flange portion, which includes a base that is coupled to a surface by a magnet and that is coupled by hinges to one or more adjacent hinge plates. In certain embodiments, the flange portion may include a sidewall and may include a hinged mounting plate coupled to an edge of the sidewall.

Although the present invention has been described with reference to preferred embodiments, workers skilled in the art will recognize that changes may be made in form and detail without departing from the scope of the invention.

What is claimed is:

1. A magnetic mounting assembly comprising:
    a flange portion including:
        a base plate coupled to a magnet to secure the base plate to a surface, the base plate including a first hinge coupled to a first edge and a second hinge coupled to a second edge;
        a sidewall coupled to the base plate along a third edge, the sidewall extending from the base at an angle and including a hinge portion; and
        a mounting plate including a hinge portion configured to couple to the hinge portion of the sidewall via a pin to form a hinge, the mounting plate to provide a mounting surface configured to pivot relative to the base plate about the pin via the hinge.

2. The magnetic mounting assembly of claim 1, further comprising one or more hinged plates, each hinged plate including:
    a planar surface coupled to a magnet;
    a first hinge portion along a first edge of the planar surface;
    a second hinge portion along a second edge of the planar surface; and
    a pin sized to fit within the first hinge portion or the second hinge portion;
    wherein a first hinged plate of the one or more hinged plates includes the first hinge portion coupled to one of a first hinge or a second hinge of the base plate via the pin to form a hinge about which the base plate and one of the one or more hinged plates pivot.

3. The magnetic mounting assembly of claim 2, wherein the each hinged plate may pivot about one of the first hinge portion and the second hinge portion to fit a curvature of a mounting substrate.

4. The magnetic mounting assembly of claim 2, wherein the base plate, the mounting plate, and the one or more hinged plates are formed from stainless steel.

5. The magnetic mounting assembly of claim 1, wherein the first hinge portion and the second hinge portion of the base plate are offset from a longitudinal axis of the base plate.

6. The magnetic mounting assembly of claim 1, further comprising:
    a second flange portion including:
    a base plate coupled to a magnet and including a first hinge along a first edge and a second hinge along a second edge;
    a sidewall extending from the base plate adjacent to a third edge, the sidewall including a hinge portion along a distal end of the sidewall;
    a mounting plate to provide a mounting surface and including a hinge portion; and
    a pin configured to couple the hinge portion of the base plate to the hinge portion of the sidewall to form a hinge configured to allow the mounting plate pivot about the hinge to form an angle relative to the base plate.

7. The magnetic mounting assembly of claim 6, wherein the mounting plate of the flange portion and the mounting plate of the second flange portion are pivoted toward one another and coupled together by a reinforcing plate.

8. A magnetic mounting assembly configured to couple a device to a metallic structure, the assembly comprising:
    a flange portion including:
        a mounting plate configured to engage a mounting structure of the device;
        a base plate coupled to the mounting plate and including a magnet configured to engage a surface of a structure; and
        first and second hinge portions coupled to the base plate, the first hinge portion coupled to a first edge of the base plate, the second hinge portion coupled to a second edge of the base plate; and
    one or more hinged plates, each hinged plate including:
        a planar surface coupled to a magnet; and
        a hinge portion coupled to a first edge; and
    a pin to couple the hinge portion of the hinged plate to one of the first hinge portion or the second hinge portion of the base plate to form a hinge.

9. The magnetic mounting assembly of claim 8, wherein the flange portion further includes a sidewall extending between the base plate and the mounting plate, the sidewall including a hinge portion configured to couple to a corresponding hinge portion of the mounting plate via a pin to form a hinge such that the mounting plate pivots about the hinge.

10. The magnetic mounting assembly of claim 8, wherein the hinged plate may pivot about the hinge to fit a curvature of the surface of the structure.

11. The magnetic mounting assembly of claim 8, wherein the base plate, the mounting plate, and the one or more hinged plates are formed from stainless steel.

12. The magnetic mounting assembly of claim 8, wherein the first hinge portion and the second hinge portion of the base plate are offset from a longitudinal axis of the base plate.

13. The magnetic mounting assembly of claim 8, further comprising:
   a second flange portion including:
   a second mounting plate configured to engage a mounting structure of the device; and
   a base plate coupled to the second mounting plate and including a magnet configured to engage a surface of a structure.

14. The magnetic mounting assembly of claim 13, wherein:
   the flange portion further includes a sidewall extending between the base plate and the mounting plate, the sidewall including a hinge portion configured to couple to a corresponding hinge portion of the mounting plate via a pin to form a hinge such that the mounting plate pivots about the hinge relative to the mounting plate of the flange portion;
   the second flange portion further includes a sidewall extending between the base plate and the second mounting plate, the sidewall including a hinge portion configured to couple to a corresponding hinge portion of the second mounting plate via a pin such that the second mounting plate pivots about the hinge of the second flange portion; and
   the mounting plate of the flange portion and the second mounting plate of the second flange portion are pivoted toward one another and coupled together by a third plate configured to couple to the device.

15. A magnetic mounting assembly comprising:
   a flange portion including a base plate coupled to a first magnet, the base plate including first hinge portion along a first edge and a second hinge portion along a second edge, the flange portion further including a mounting plate configured to couple to a device;
   a first hinged plate coupled to a second magnet, the first hinged plate including a first hinge portion along a first edge of the first hinged plate;
   a first pin configured to couple the first hinge portion of the first hinged plate to the first hinge portion of the flange portion, the first hinge portion of the first hinged plate, the first hinge portion of the flange portion, and the pin cooperate to form a first hinge;
   a second hinged plate coupled to a third magnet, the second hinged plate including a first hinge portion configured to couple to the second hinge portion of the flange portion; and
   a second pin configured to couple the first hinge portion of the second hinged plate to the second hinge portion of the flange portion, the first hinge portion of the second hinged plate, the second hinge portion of the flange portion, and the second pin cooperate to form a second hinge.

16. The magnetic mounting assembly of claim 15, wherein:
   the first hinged plate includes at least one second hinge portion; and
   the second hinged plate includes at least one second hinge portion.

17. The magnetic mounting assembly of claim 16, further comprising a plurality of hinged plates including the first hinged plate and the second hinged plate, each of the plurality of hinged plates including first and second hinge portions,
   the first hinged plate configured to couple to a selected one of the first hinge portion of the base plate, the second hinge portion of the base plate, or the second hinge portion of the second hinged plate.

18. The magnetic mounting assembly of claim 16, wherein:
   the flange portion further includes a sidewall extending from the base plate and including a hinge portion on at least one edge; and
   the mounting plate further includes a hinge portion configured to couple to the hinge portion of the sidewall, by a pin, to form a hinge.

19. The magnetic mounting assembly of claim 18, wherein the mounting plate is configured to pivot about the hinge relative to the sidewall.

20. The magnetic mounting assembly of claim 15, wherein the base plate, the mounting plate, the first hinged plate, and the second hinge plate are formed from stainless steel.

\* \* \* \* \*